(12) United States Patent
Eyrignoux et al.

(10) Patent No.: US 7,107,895 B2
(45) Date of Patent: Sep. 19, 2006

(54) COFFEE MEASURING DEVICE

(76) Inventors: Claudine Eyrignoux, 12, Rue Jean Filliol, Brive (FR) F-19100;
Jean-Claude Eyrignoux, 12, Rue Jean Filliol, Brive (FR) F-19100

( * ) Notice: Subject to any disclaimer, the term of this patent is extended or adjusted under 35 U.S.C. 154(b) by 256 days.

(21) Appl. No.: 10/343,121

(22) PCT Filed: Aug. 22, 2001

(86) PCT No.: PCT/FR01/02650

§ 371 (c)(1),
(2), (4) Date: Jan. 28, 2003

(87) PCT Pub. No.: WO02/15759

PCT Pub. Date: Feb. 28, 2002

(65) Prior Publication Data

US 2003/0183086 A1    Oct. 2, 2003

(51) Int. Cl.
*A47J 31/00*   (2006.01)
(52) U.S. Cl. .......................... 99/285; 99/275; 99/279; 99/306
(58) Field of Classification Search .................. 99/285, 99/295, 305, 279, 275, 306, 323; 210/85, 210/86
See application file for complete search history.

(56) References Cited

U.S. PATENT DOCUMENTS

| | | | | |
|---|---|---|---|---|
| 2,513,593 A | * | 7/1950 | Smith | ........................... 99/285 |
| 4,055,114 A | * | 10/1977 | Kats et al. | ..................... 99/280 |
| 4,757,616 A | * | 7/1988 | Hills | ........................... 33/488 |
| 5,536,393 A | * | 7/1996 | Weeks | ......................... 210/86 |
| 5,657,548 A | * | 8/1997 | Kellar, Sr. | ................... 33/405 |
| 5,778,764 A | * | 7/1998 | Nielsen | ....................... 99/285 |
| 5,863,431 A | | 1/1999 | Salzburg | |
| 6,067,894 A | * | 5/2000 | Eugster | ....................... 99/285 |

FOREIGN PATENT DOCUMENTS

| | | |
|---|---|---|
| DE | 196 06 775 | 8/1997 |
| DE | 198 36 067 | 2/2000 |
| DE | 19836067 | * 2/2000 |
| FR | 1 601 536 | 8/1970 |
| FR | 2 764 497 | 8/1970 |
| FR | 2 307 502 | 11/1976 |

* cited by examiner

Primary Examiner—Reginald L. Alexander
(74) Attorney, Agent, or Firm—Young & Thompson

(57) ABSTRACT

A device for measuring out coffee in a coffee-maker with conical paper or synthetic fibre filter, characterised in that it comprises at least a slide (300) including at least a mark for measuring out an amount of coffee when the slide (300) is arranged inside a volume defined by a wall (2) of the filter, the slide (300) being arranged along the wall (2) when measuring out at least an amount of coffee.

11 Claims, 8 Drawing Sheets

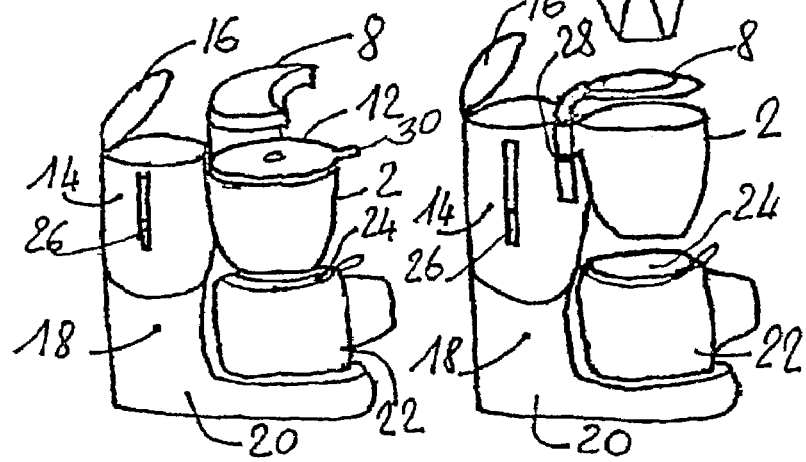
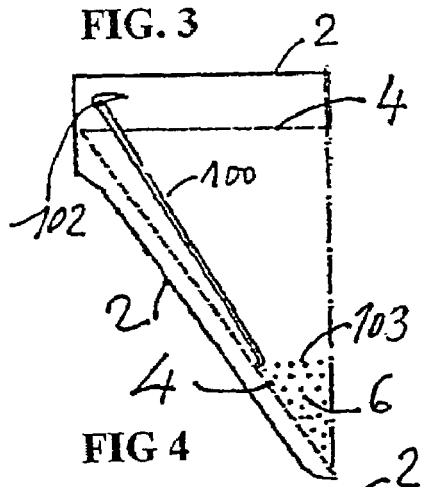
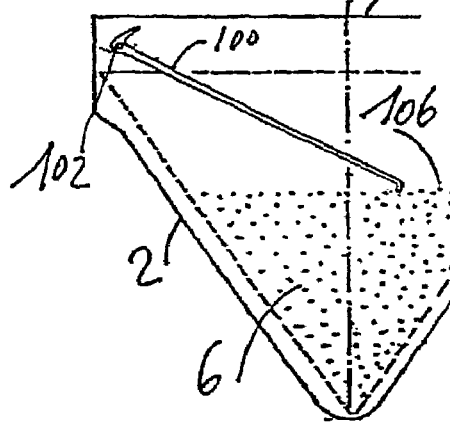
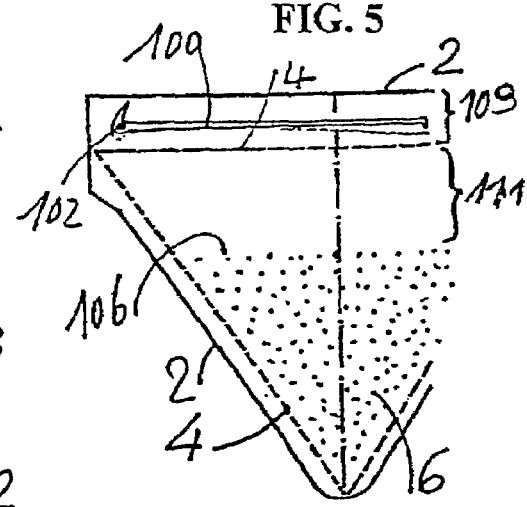
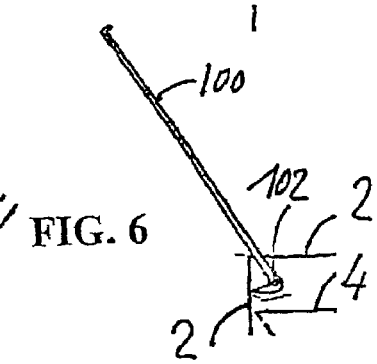

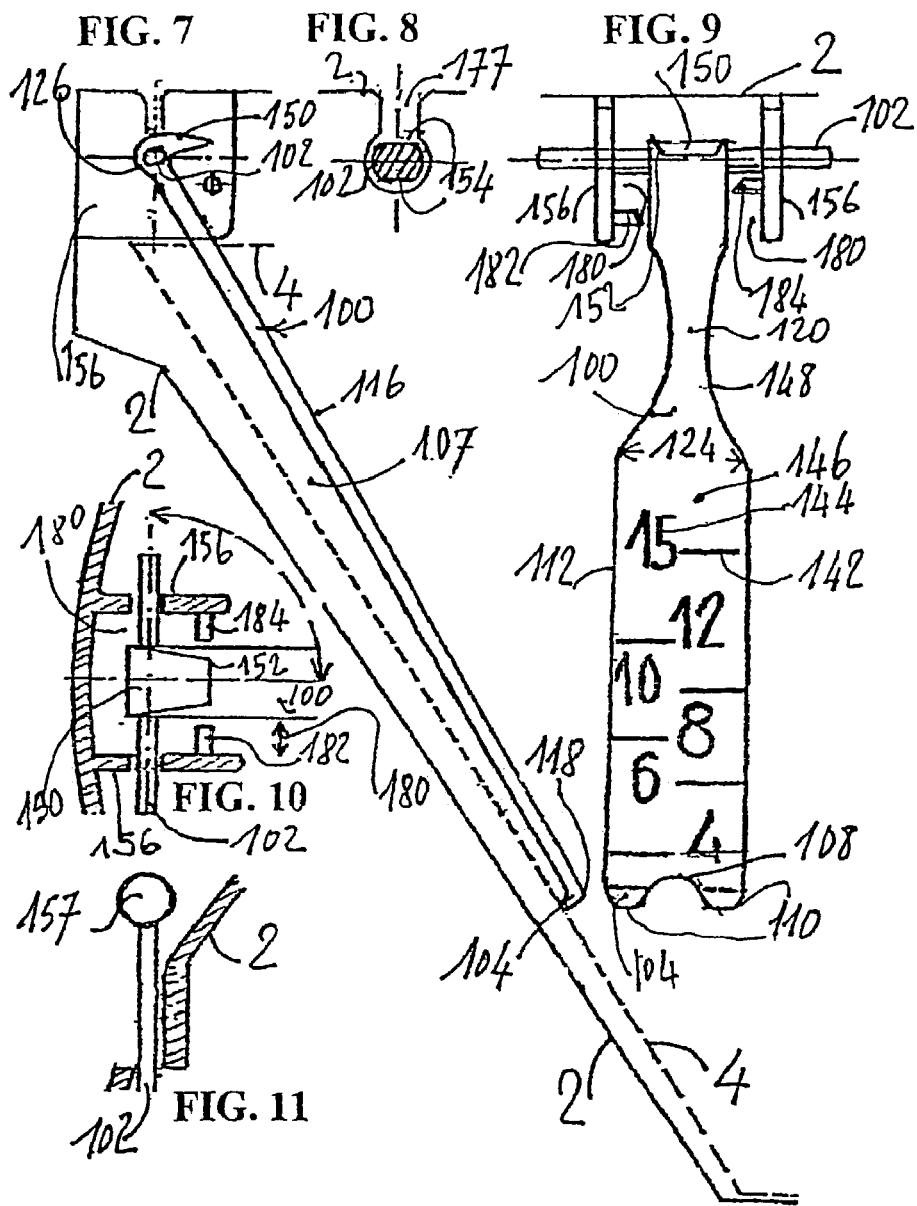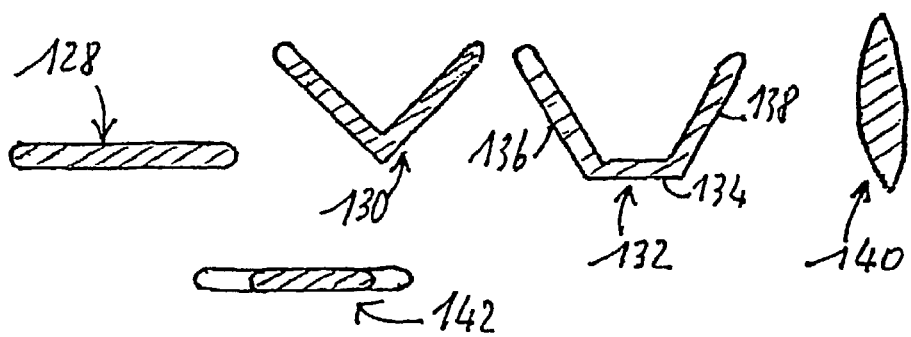

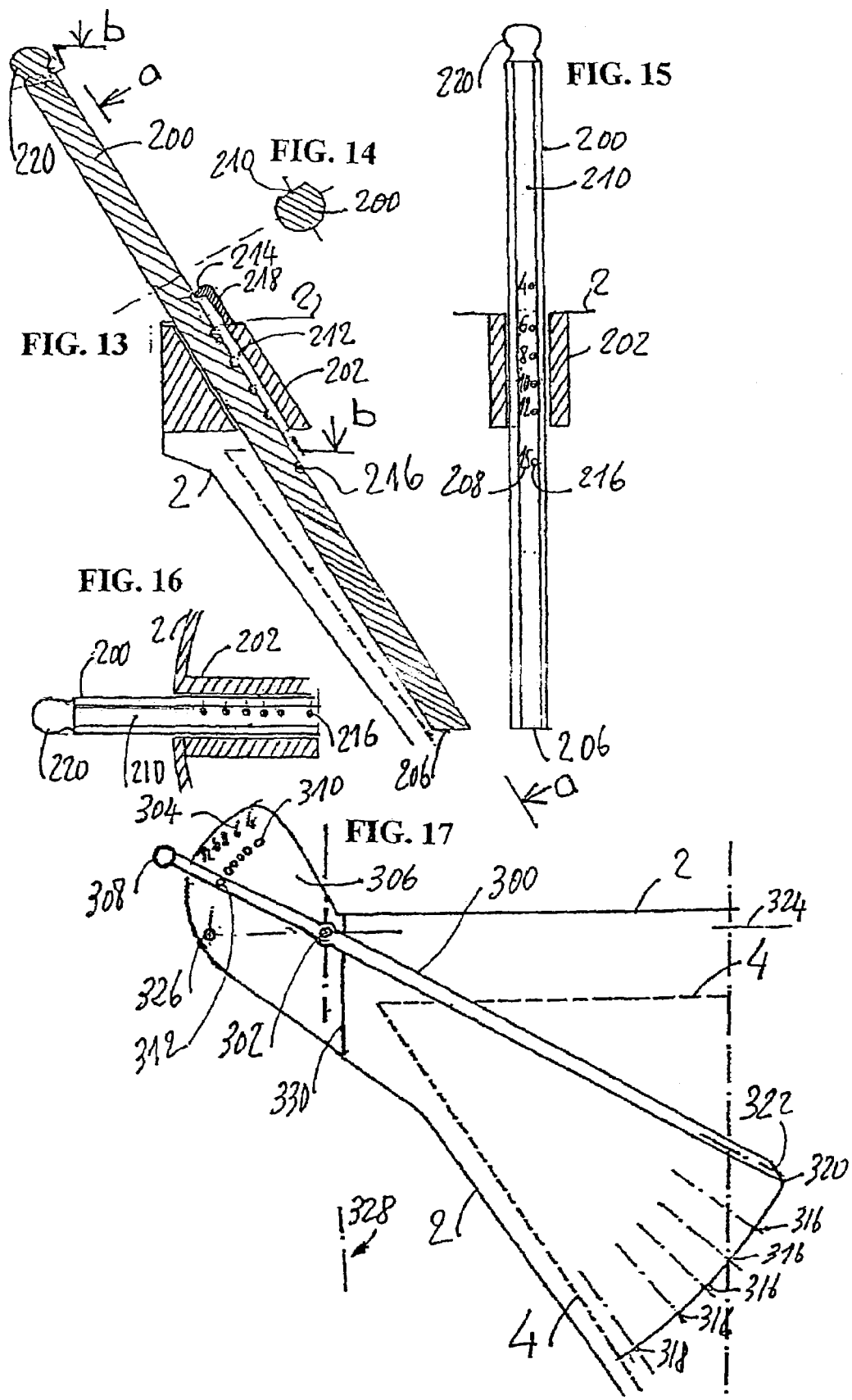

FIG. 23
FIG. 24
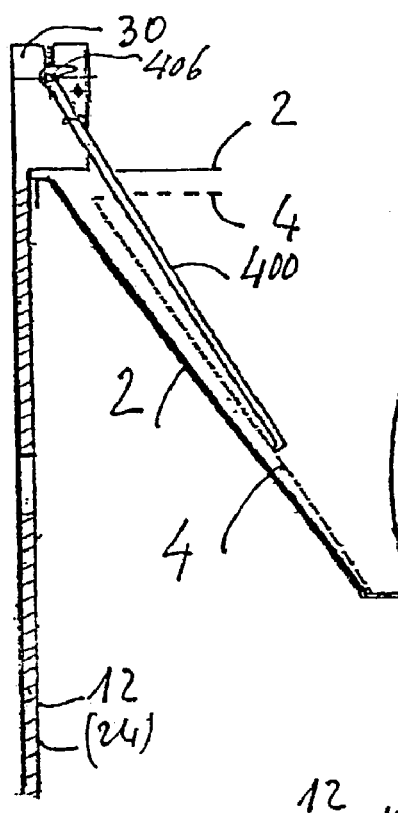
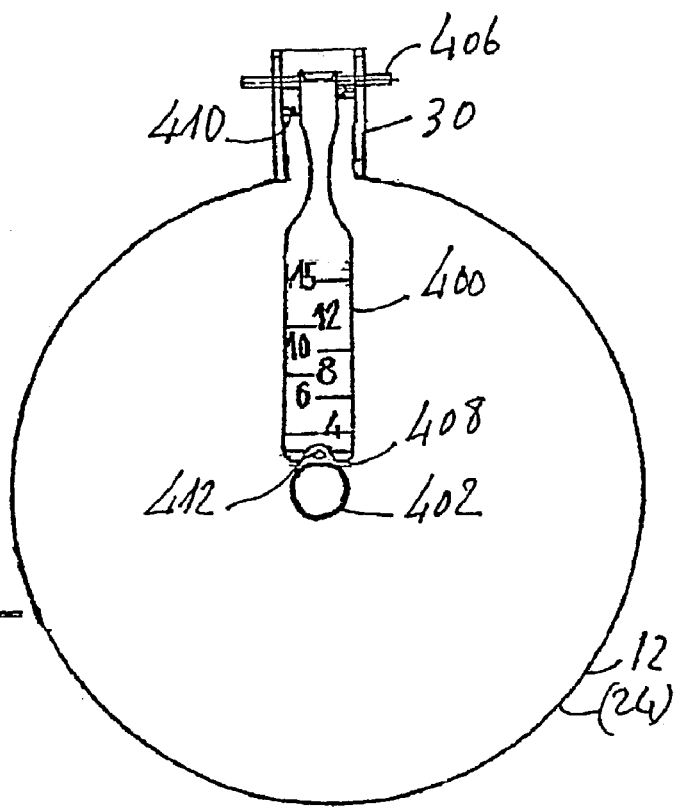
FIG. 25
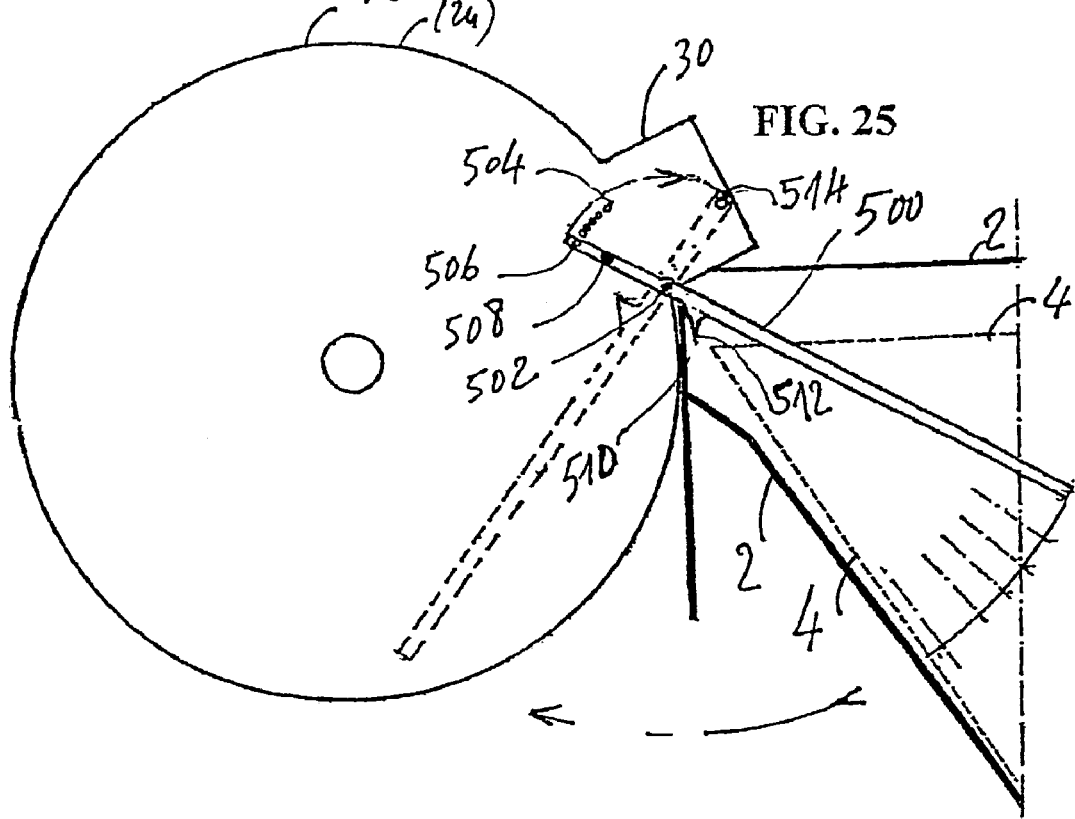

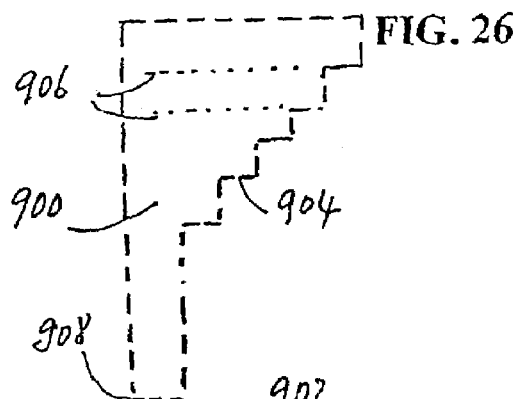
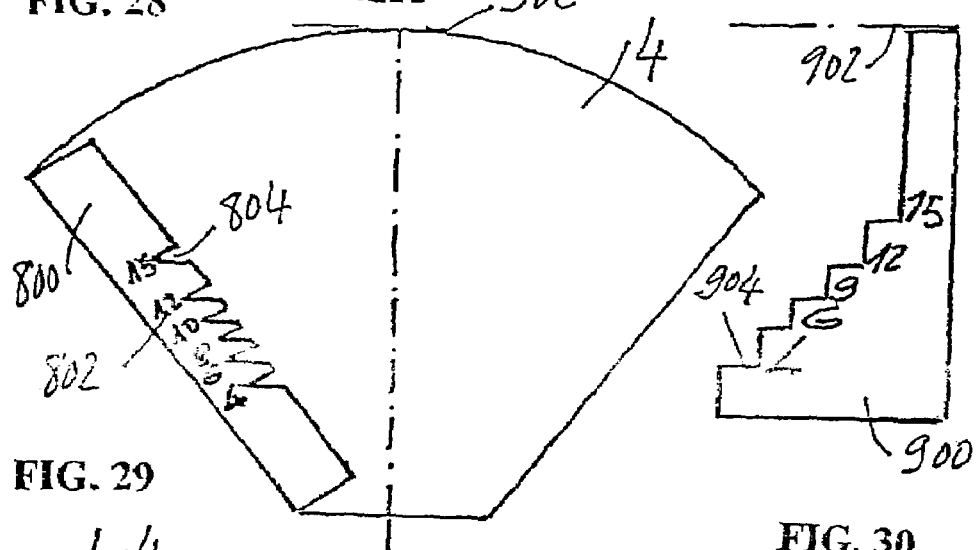
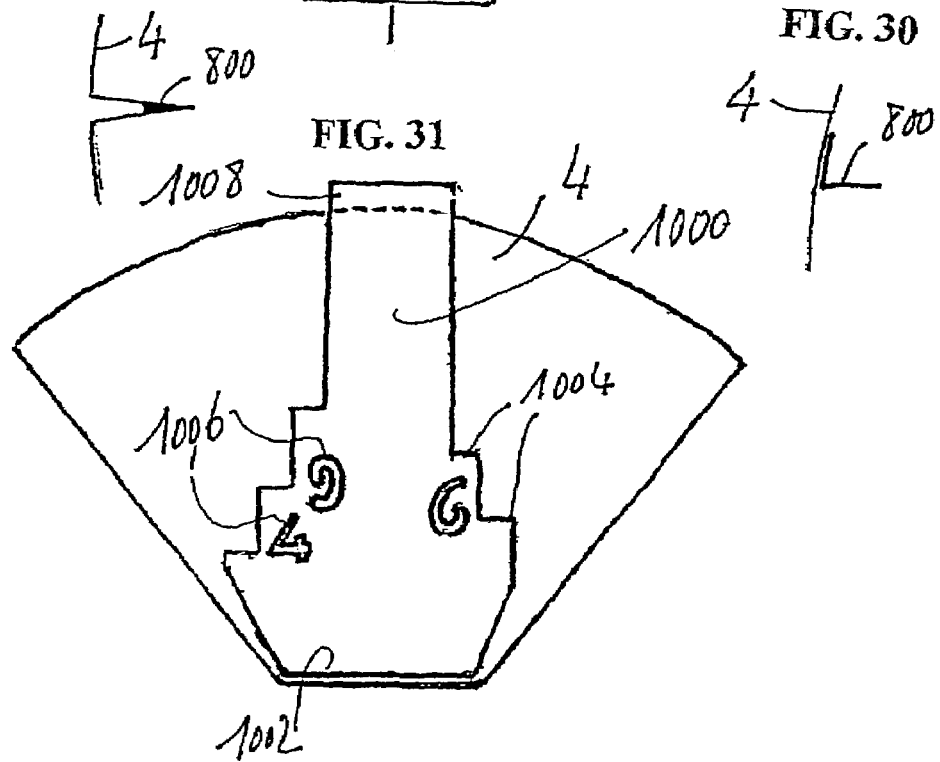

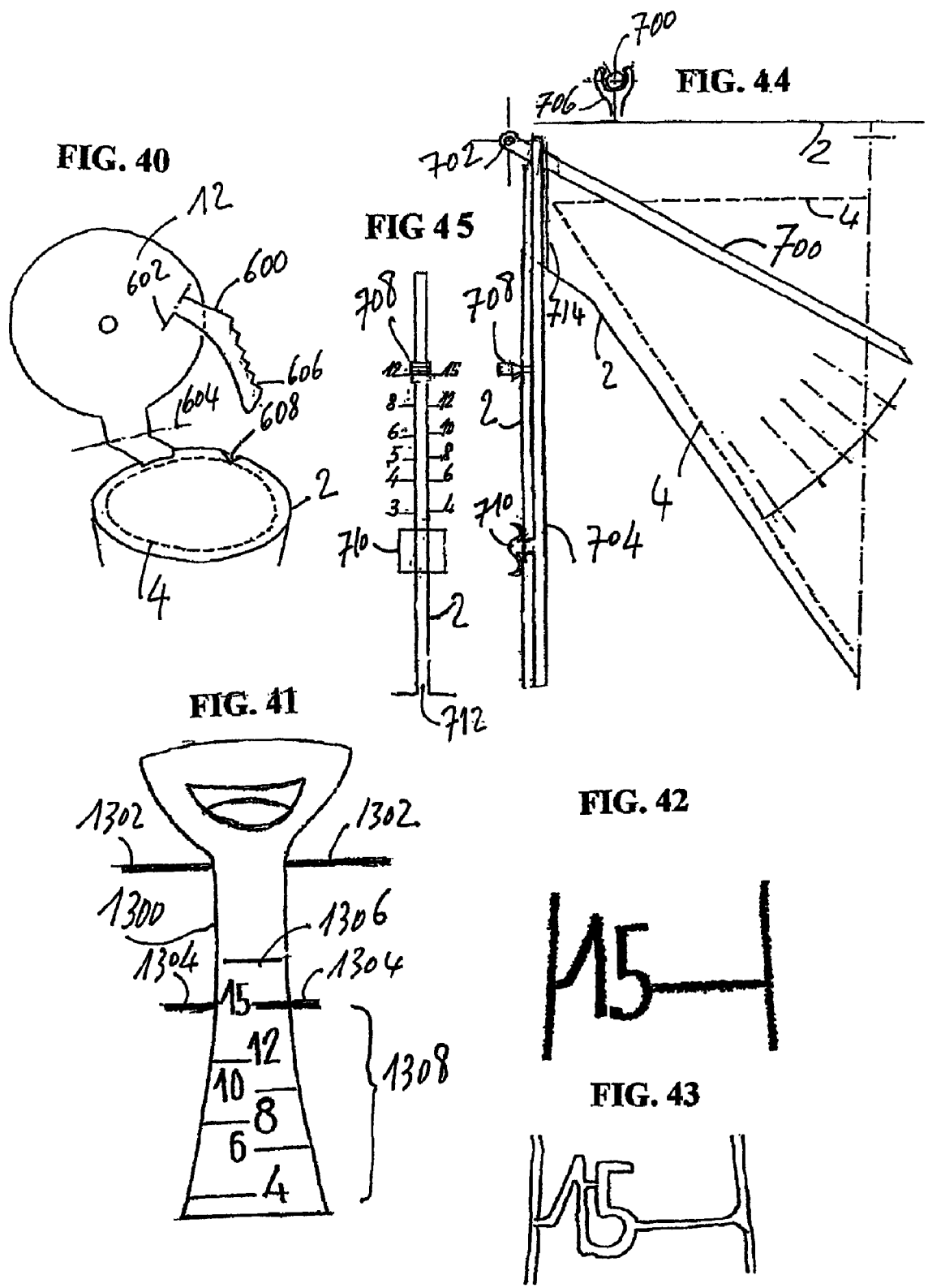

COFFEE MEASURING DEVICE

BACKGROUND OF THE INVENTION

This invention concerns a device for measuring out coffee tipped straight from the packet into the conical filter of a coffee-maker.

Traditionally coffee is measured out using a special measuring scoop or a spoon. The coffee is taken from the packet and placed in the coffee-maker filter in the amounts required. For example ten scoops for twelve cups of coffee. Each operation involves filling the scoop inside the packet, checking the level, bringing the scoop over to the coffee-maker and tipping the coffee into the filter. As the packets are taller than the scoops, the consumer has to put his fingers in the packet. The packets are black and visibility inside is poor, so this old-fashioned method of measurement is inaccurate, time-consuming, tedious, and messy involving spillage of coffee and loss of aroma.

SUMMARY OF THE INVENTION

The invention offers a simple remedy for at least one of these drawbacks and provides electric coffee-makers with a convenient method for measuring out the coffee as quickly and accurately as the water. The invention concerns a device for measuring out coffee in a coffee-maker with conical paper or synthetic fiber filter, characterized in that it comprises at least a slide including at least a mark for measuring out an amount of coffee when said slide is arranged inside a volume defined by a wall of the filter, the slide being arranged along the wall when measuring out at least an amount of coffee.

Consequently the invention avoids imposing any constraints in that it creates a new coffee-maker feature designed to visualize the coffee level. Under this invention the slide rests upon the wall of the filter or the filter receptacle (for example, a filter-holder or filter-basket), which in some versions of the invention will mean simply leaning the slide along the filter wall.

This configuration of the slide enables it to be used very simply for measuring out the coffee without any complicated attachments that often require a complete re-design of the coffee-maker.

The invention deals with the problem of coffee measurement in both unmodified existing and new coffee-makers. With the invention the coffee is emptied accurately from the packet into the filter in a few seconds, avoiding any spillage or mess and giving the consumer a regular and reliable way of determining the specific amount of coffee to which he is accustomed.

This method takes account of the various strengths of coffee traditionally served in each country. It only requires the slides to be adapted without modifying the other components of the coffee-maker. Furthermore, the free-standing slides may constitute a communication and advertising medium between the consumers and the coffee trade: the producers, roasters, retailers and coffee-maker and filter manufacturers.

The slides can be manufactured industrially in materials identical to those used for coffee-makers or in any other food-grade materials.

The manufacture and marketing of free-standing slides may be independent of the coffee-maker trade particularly with respect to coffee-makers already in existence and may fall within the category of general household items.

As a characteristic, one mark on the slide corresponds to at least one graduation.

Thus, for example, the slide may carry only one mark with several additional graduations offset with respect to the mark lying within the volume of the filter.

Furthermore, several marks might be provided, each corresponding to a graduation, lying within the volume of the filter.

As other characteristics:

the graduations are arranged according to several measurement scales, the graduations are arranged on the two opposite faces of the slide, the graduations are in the form of cut-outs in the slide material, the slide is pierced in such a way that the graduations are represented by the material left whole, the graduations are staggered on one face of the slide.

As a characteristic, the graduation or graduations are arranged within the volume defined by the wall of the filter during measurement.

Alternatively, the graduations might be offset at least partially outside the volume defined by the wall of the filter during measurement.

This would for example facilitate reading off the graduations on the slide.

However, it will be noted that when the slide is arranged within the volume of the filter in the configuration resting on the filter or the receptacle containing the filter, legibility of the graduations located on the part of the filter within this volume is still very good.

As a characteristic, the slide is fitted with a manipulation device which makes it easy for the user to manipulate. The slide can then be moved to different stable positions when it is attached to the coffee-maker or, when it is completely free-standing with respect to the coffee-maker, it can be simply positioned within the filter or stowed away.

In one type of embodiment the slide can be moved to several stable positions within the volume defined by the filter wall.

These positions mostly correspond to positions for which the mark or marks on the slide enable different amounts of coffee to be measured out.

Furthermore, the slide may also be moved to take up several stable positions outside the volume defined by the filter wall.

One of these positions corresponds to the position in which the slide is stowed.

As a characteristic, the slide is fixed to the coffee-maker by a linkage enabling the slide to move away from or towards the filter wall.

The linkage takes the form for example of a pivot or a ball-and-socket.

The slide linkage placed on the walls of the filter-holder or filter-basket close to the filter enables the slide to move to take up several stable positions within the volume defined by the filter wall.

As a characteristic, the movement of the slide is controlled indirectly by the user, that is to say that the user does not have to handle the slide directly with his fingers.

As a characteristic, the graduations are arranged in such a way as to constitute a single measurement scale for the coffee and the water.

In one variant, the slide is mounted so as to slide along the coffee-maker. The sliding movement is effected for example parallel to the filter wall.

This sliding movement, once the measurement process completed, enables the slide to be moved out of the filter volume during percolation.

As a characteristic, in one of the stable positions of the slide as it lies against the filter, one end of it is located at a distance from the filter bottom corresponding to a minimum amount of coffee.

As another characteristic, the end of the slide acts as a mark to indicate, according to its position with respect to the filter wall inside the internal volume of the filter, an amount of coffee to be measured out.

In moving away from or towards the filter wall, the end of the slide in its different positions indicates the different amounts of coffee to be measured out.

The mobility of these articulated slides enables them to be stowed away out of the coffee after measurement and during percolation.

In another type of embodiment of the invention, the slide is placed at least partially within the volume defined by the filter and along it.

This type of embodiment is particularly simple since it requires no particular method of fastening to operate the slide within the filter, as the slide is arranged along the wall of said filter.

As a characteristic, the slide comprises at least one part placed within the volume defined by the filter wall and at one end two legs with a cut-out between them to facilitate percolation of the coffee.

Furthermore, these two legs ensure stability when the slide rests on the filter bottom.

As a characteristic, the slide comprises at the opposite end a handling aperture to help position the slide within the filter or stow it away.

As a characteristic, the slide can be stowed within the volume of the coffee-maker, so that no provision for stowage space needs to be made outside.

The entirely free-standing slide in this type of embodiment does not require any special arrangement for it to be operated with existing coffee-makers.

As another characteristic, the slide is made of a material which is at least partially optically transparent.

This provides for example enhanced legibility for the graduations on the slide.

As yet another characteristic, the measurement device comprises a part in which one or more graduations are provided such that a mark corresponds at least to one graduation with said part made of a material at least partly optically transparent.

This provides the graduations with good legibility.

The part of the device so concerned may be for example the articulation or the support securing the slide to the coffee-maker.

In another type of embodiment, the slide arranged along the filter wall is made of a material identical to that of the filter and is distinct from the conical shape of said filter.

This configuration of the slide is not such as to modify the primary function of the paper or synthetic fiber filter but adds a further functionality.

As a characteristic, the slide is firmly fixed to the slide.

It is to be noted that the slide may be detached from the filter and sold thus with the filter to consumers.

As another characteristic, the slide is placed at least partially within the volume defined by the filter wall.

Consequently, in this type of embodiment it is also possible to consider offsetting the graduations placed on the slide outside the internal filter volume.

BRIEF DESCRIPTION OF THE DRAWINGS

Other characteristics and advantages will appear in the course of the description that follows, offered solely by way of example and not in a limiting sense and in reference to the appended drawings, on which:

FIGS. 1 and 2 illustrate two different coffee-maker models;

FIGS. 3 to 6 represent vertical cross sections of a slide articulated in accordance with the invention in four main positions;

FIG. 7 represents a cross section of a slide 100 in the measuring position in the filter 4;

FIG. 8 is a enlarged schematic view of the articulation axis 102 represented on FIG. 7 in vertical cross section;

FIG. 9 is a front view of the slide as in FIG. 7;

FIG. 10 is a top view of the cross section along the axis 102 of FIG. 9;

FIG. 11 illustrates a variant of the articulation axis 102 from above;

FIG. 12 represents different variants on the transversal cross section of the body of a slide in accordance with the invention;

FIGS. 13 to 16 are schematic views from different angles of a mobile slide in translation with respect to the coffee-maker;

FIG. 17 is a view of the articulated slide according to the invention;

FIGS. 23 and 24 represent a slide articulated on the coffee-maker lid;

FIG. 25 illustrates a variant of the embodiment of the slide articulated on the coffee-maker lid;

FIGS. 26 to 31 illustrate different slides in accordance with the invention of the type made from the same material as the filters;

FIG. 40 illustrates a slide 600 fixed to the lid of a coffee-maker;

FIG. 41 is a view of a slide positioned along the filter wall similar to that represented on FIGS. 32 to 35;

FIGS. 42 and 43 are partial schematic views of graduations made in two different ways;

FIGS. 44 and 45 represent a slide articulated and controlled by a manipulating rod.

DESCRIPTION OF THE PREFERRED EMBODIMENTS

Figure 18:
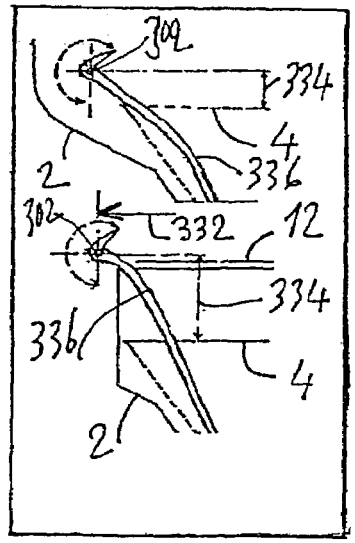
FIG. 18 illustrates variants of embodiment of the articulated slides of the type represented in FIG. 17.

Before describing the different types of embodiment of the invention, a brief outline will be given of the principles on which the most widely used coffee-makers operate with reference to FIGS. 1 and 2.

FIG. 1 represents a coffee-maker with its filter-holder 2 placed on the coffeepot 22.

FIG. 2 represents a coffee-maker with the filter-holder 2 that pivots on the body of the coffee-maker at 28. An exploded view illustrates the paper filter 4 and the filter basket 10 existing on some models of coffee-maker.

In all models of coffee-maker, the filter-holder 2 holds the filter 4 into which the coffee 6 is tipped. Some models of coffee-maker are equipped with a filter-basket 10 fitted between the filter-holder 2 and the filter 4.

Via the cover 8, the steam is led in through a tube

On the filter-holder 2 a cover 12 is placed and provides a handle 30.

A water tank 14 fitted with a lid 16 is supported by the body of the coffee-maker 18 which is firmly attached to the base 20.

The coffeepot 22 is closed by the lid 24.

The water filling level in the water tank 14 is indicated through the transparent graduated window 26.

The reference numbers shown on FIGS. 1 and 2 will be used throughout the outline of the invention.

In a first type of embodiment, the slides have one or more points of attachment to the coffee-maker. They are moveable and when the coffee is measured out they are positioned partly in the filter into which the coffee is to be tipped where they either remain during percolation or are stowed elsewhere, as the user prefers. They comprise one or more graduations either on the part within the filter or else offset outside this volume.

FIGS. 3 to 25, 40, 44 and 45 illustrate articulated slide types of embodiment and, more generally, slides that can be moved to take up several stable positions inside and outside the filter.

On FIG. 3 the slide 100 articulated around axis 102 is brought down into the filter 4. The minimum coffee fill level is indicated by reference 103.

On FIG. 4 the slide 100 is in a position of maximum coffee fill as indicated by reference 106.

On FIG. 5 the slide 100 is stowed in the volume 109 lying between the upper coffee fill level and the lid 12. A volume beneath is intended to allow for coffee expansion during percolation.

On FIG. 6 the slide 100 is swung outside the filter-holder 2 so as to empty the filter and the coffee from the filter-holder. This position also corresponds to that of the filter-holder upside down in a dishwasher.

As represented in FIGS. 7 and 9, there are legs at the base of the slide standing on the said filter 4 thus defining a space 107 between filter and slide to facilitate percolation along the filter.

A cut-out 108 between the legs 104 (FIG. 9) also facilitates percolation. The two legs 104 provide the slide with stability along the slide.

The substantially rounded-off shape 110 of the legs 104 avoids the filter being damaged. In a variant not shown, there may be openwork in the body 100 further facilitating percolation.

In the stable position represented on FIG. 3 or 7, the end of the slide where the legs 104 are located rests against the filter. In this position the free end of the slide is located at a distance from the bottom of the filter corresponding to a minimum serving of coffee. Other stable positions such as those represented on FIGS. 3 and 6 are possible depending on the amount of coffee required (FIGS. 2 and 3).

The slide includes an area for the marks serving as graduations 112 and this area contains, for example, a section between the areas referenced 116 and 118 which is slimmer towards the end where the legs 104 are located to facilitate flow (FIG. 7).

The width 124 of the slide represented on FIG. 9 corresponds, when this width is small, to a single scale of graduations (e.g. small cups).

The opposite end of the slide body to that where the legs 104 are located is where the articulation axis 102 is located.

This opposite end, narrower than the width 124 of the graduations area, is connected to the latter by an area forming a neck 120 of lesser width than the areas it connects.

At the opposite end 126 the slide is thicker to carry the axis 102.

By way of variations, FIG. 12 indicates slide cross-sections non-exhaustively.

Cross-section 128 being wider than cross-section 124 of the opposite end 126 (FIG. 9) can consequently include two scales of graduations for small and large cups.

The same is true of the V-shaped 130 and trapezoidal 132 cross-sections and the oblong cross-section pivoted through 90 degrees reference 140.

In variant 132 the common marks are graduated on the front part 134 while, for example, the side part 136 indicates the small cups and the side part 138 the large cups.

The cross-section indicated at 140 is elliptical in shape and cross-section 142 is variable depending on the longitudinal dimension of the slide. Consequently the slide can adopt all possible geometrical shapes: prism, cylinder, cone, pyramid, sphere, etc.

The graduations illustrated by the lines 142 and numbers 144 (FIG. 9) are embodied in the material of which the slide is made providing a raised or depressed surface or a combination of the two in order to create shadowing and enhanced visibility.

It is also possible to use graduations of the type shown on FIGS. 42 and 43.

The lines and numbers are staggered in order to allow the numbers to be as tall as possible (enhanced visibility), e.g. at least 8 mm.

The part of the slide forming the neck 120 carries no graduations so it may be of lesser width with an external profile as indicated by the curve 148 and the cross-section not represented may be circular.

At the head of the slide located at the end opposite the base there is a tab 150 tapered towards the end 152 on all four faces to make grasping it easier.

Figure 21:
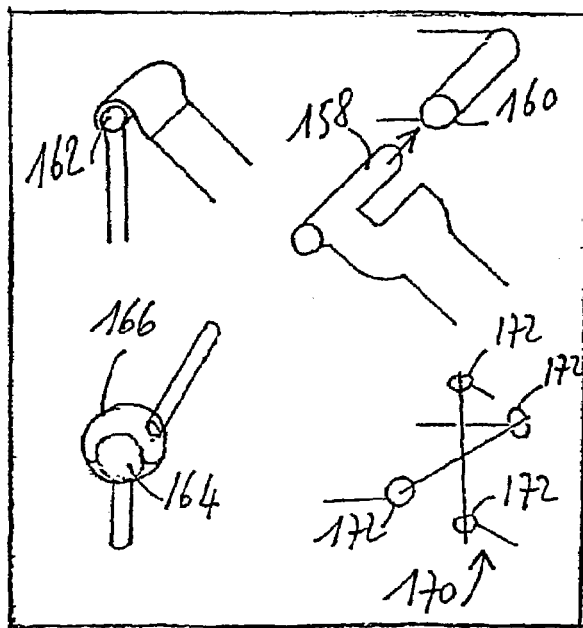

FIG. 21 represents schematically some examples of possible articulations: a roller 162, a split hinge 158/160, an assembly 164/166 constituted by a ball-and-socket joint mounted by the expansion of a female part 166, an articulation 170 comprising a universal joint with four rotations 172, this latter articulation permitting the mounting and easy reading of the slide with profile 140 (FIG. 12).

Advantageously, the male part 164 of the assembly 164/166 may take offset graduations and the female part may be embodied in a transparent and magnifying material to facilitate reading off the graduations.

Alternatively, the graduations might be placed on the female part 166 of the assembly.

Figure 22:
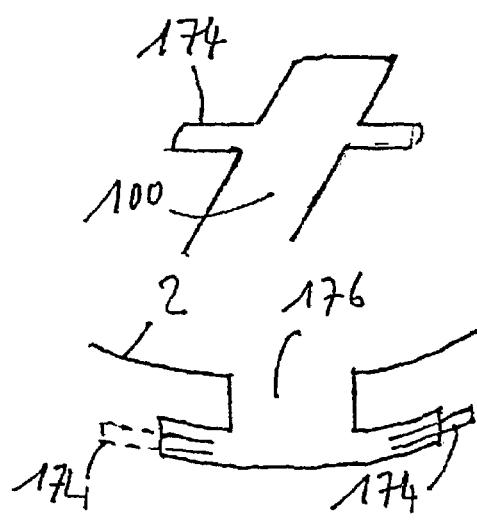

FIG. 22 is an example of the slide 100 being mounted on the filter-holder 2 by means of an axis 174 abutting against the outside or inside of the filter-holder 2 when the slide descends through the slot 176.

The axis shown on FIG. 8 is flattened on two sides reducing its width so as to enable it to be introduced through the passages 177 in the two supporting lugs 156 and keep the slide captive when in the position shown in FIG. 5.

FIG. 10 represents the way in which the slide may be moved in the spaces 180 in order to have it rest on the pins 182 and 184.

Resting on the pin 184 the slide is in the FIG. 4 position corresponding to the maximum serving (coffee-maker full).

Resting on the pin 184 the slide is in the FIG. 5 position, that is to say horizontally stowed above the coffee.

On FIG. 10 the angle between the slide 100 and the axis 102 is 90 degrees. However, this angle might be reduced in the plane of FIG. 10. This would allow the slide to clear the center of the filter and thus not block the arrival of steam in the filter.

FIG. 11 is a variant of the embodiment of the axis 102 extending outside the filter-holder 2 and is fitted with a knob 157 (manipulation facility) by which the slide 100 may be grasped and manipulated.

In this case the slide has no tab 150.

This latter arrangement also makes it possible, as a variant, to do away with the supporting lugs 156 and articulate the slide along the chord of the circle of the upper edge of the filter-holder.

Figure 19:
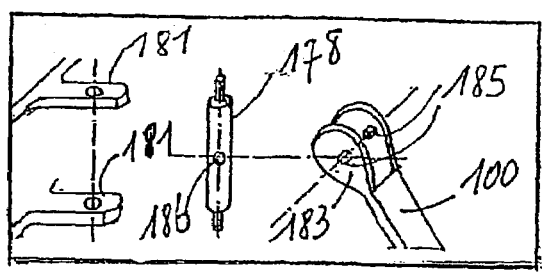
FIGS. 19 to 22 illustrate different types of slide articulation mountings in accordance with the invention.
Figure 20:
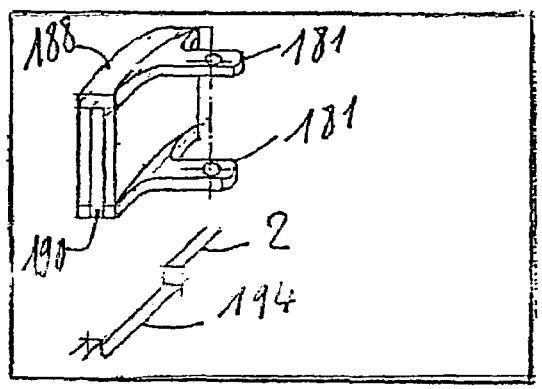

FIG. 19 represents a variant of the articulation around a vertical pivot 178 fitted on the supporting arms 181. The slide 100 is mounted on the pivot 178 by means of a stirrup 183 and pins 185 engaged in the opening 186.

As a variant (FIG. 20), the supporting arms 181 may be mounted on component 188 whose slot 190 may be fitted on to the recess 194 of the filter-holder 2. Consequently the articulation is detachable from the coffee-maker and can be mounted on existing coffee-makers.

The different types of articulated slide just described can be moved away from or towards the filter wall on account of their pivoting, universal or other linkage.

FIGS. 13, 14, 15 and 16 represent a mobile slide 200 in translational movement with one or more graduations offset outside the volume of the filter intended to receive the coffee.

This slide can move to occupy several stable positions within the internal volume defined by the wall giving the filter its conical shape (volume of the filter to receive the coffee).

As represented on FIGS. 3, 4 and 7, the end of the slide acts as mark to indicate, according to its position with respect to the filter wall in its internal volume, the amount of coffee to be measured out.

FIG. 13 is a longitudinal cross-section of the slide 200 sliding in a support 202 parallel to the wall of the filter.

FIG. 15 shows the cross-section a—a of the slide with graduations 208.

FIG. 16 shows the cross-section b—b of the slide 200. With this slide the coffee measuring level in the filter is provided by the end 206 of the slide.

The whole scale of graduations is shifted upwards with the FIGS. 208 partly representing the graduations indicated on a flat face of the slide. FIG. 14 shows the appearance of the transversal cross-section of the slide with its flat face 210.

This flat face 210 slides along a flat part 212 of the support 202 which prevents the slide rotating as it moves along. The slide is held by a catch 214 slotting into graduation indentations 216 using the flexible rod 218 carrying the catch. The slide is manipulated by a knob 220 (manipulation facility) located at the opposite end 206.

This type of slide can also be installed on the cover 8, the water tank 14, the body 18 or the pivot 28 of coffee-makers.

FIG. 17 illustrates a type of slide 300 articulated in zone 302 on filter-holder 2 with the graduation numbers 304 offset on the support lug 306. This lug and the slide can be of transparent material to facilitate reading off the graduations and measuring out the required amount of coffee.

The slide 300 manipulated by a knob located at one end 308 rotates around an axis 302 and locks in place level with the graduations 304 in the indentations 310 by means of a catch 312 (identical to the catch 214 on FIG. 13) placed on the slide.

The opposite end of the slide thus takes up all the stable positions desired 316 between the minimum position 318 and the maximum position 320.

Reading off the level from the tapered opposite end provides great accuracy of measurement.

In the stowed position and during percolation, the slide is held in the position indicated by the line 324, when the knob 312 is in the indentation 326.

The knob 308 is returned to position 328 while the empty filter is being positioned or the full filter withdrawn or in the dishwasher.

The wall 330 of the filter-holder requires the lug 306 to be placed outside the filter-holder 2.

The position of the axis 302 (as well as axis 102) is adaptable in directions 332 and 334 (FIG. 18). In this case, the slides 200 and 300 each possess a curved portion 336.

As illustrated on FIGS. 23 and 24, an articulated slide 400 can be placed on the moveable lid 12 of the filter-holder or on the lid of the coffee pot.

In this case, the slide 400 has two functions apart from its measuring function, in that it forms a hook to suspend the lid 12 with respect to the filter-holder 2 (FIG. 23). This is very convenient while coffee is being measured out.

FIG. 24 is a view from below of the lid 12 showing the slide 400 in the folded back position against the lid, the handle 30 of the lid and the steam hole. The assembly constituting the articulation of the slide (according to the same principles as slide 100) is placed in the handle 30 that projects from the lid contour to hold the end of the slide and its articulation axis 406 so that the opposite end of the slide 408 clears the steam hole 402.

In a variant not represented, the articulation axis 406 is not orthogonal to the axis of the slide. The slide locks on to the pin 410 or, as an alternative, is locked by the stub 412.

FIG. 25 illustrates a slide 500 fitted to the lid 12 or 24. This slide 500 arranged beneath the internal face of the lid 12 is articulated in part 502 by a ball-and-socket type linkage locked on the indentations 504 and the pin 506 and manipulated by the knob 508 into a position corresponding to the desired amount of coffee.

As represented on FIG. 25, the lid 12 abuts against the filter-holder 2 in the part referenced 510.

Furthermore, the slide has a chock 512, for example in the form of a spout, which comes to abut against the wall of the filter-holder 2 on the side opposite the part referenced 510.

In the stowage position, the pin 506 lies in part 514.

FIG. 40 shows a slide 600 mounted on the underside of the lid 12 by an articulation 602. The lid 12 is also articulated in an area 604 on the filter-holder 2. The stepwise arrangement 606 of the graduations on the slide has two functions: it gives the desired measurement level for each graduated step and it holds the lid when one of the steps is engaged in the notch 608 which is appropriately positioned on the upper edge of the filter-holder 2.

FIGS. 44 and 45 illustrate a slide 700 articulated at 702 and controlled by a rod 704 via a stirrup 706. A level and draw-off cursor 708 slides into a slot 712 of the filter-holder 2. The rod 704 is held in the desired position by the cursor with elastic blades 710.

In a variant not represented, the stirrup 706 is replaced by the universal joint in FIG. 21. This makes it possible to offset the control and the graduations to the cover 8, the body 18, the base 20, the water tank 14 or the pivot 28 of the coffee-maker.

When the graduations are offset on to the filter-holder, they can be in common with the water graduations, which constitutes the most elaborate type of embodiment of the invention.

In a variant not represented, the rod, its cursors and the linear graduation may be replaced by a rack controlled by a geared knob with circular graduation.

In a second type of embodiment, the slides illustrated on FIGS. 26 to 31 and arranged in the measurement position along the wall of the filter are made of the same material as the filters and are accordingly consumable and disposable along with the filters.

These slides are distinct from the conical shape conferred by the filter wall so as not to affect the filtering function of the filter.

The slide 800 in FIG. 28 is integrated in filter 4, either through the folds of the filter in FIG. 29 or through the part inserted in FIG. 30.

The graduations are constituted by notches 804.

The slide 900 in FIGS. 26 and 27 is secured to the filter 4 either through continuity of the material along a fold line 902 or by dry crimping.

In FIG. 26 the slide is opened out outside the filter 4.

In FIG. 27 the slide is in the reading position at the time of measuring out the coffee and the graduation levels are represented by steps 904.

As a variant, the slide 900 is folded along the dotted lines 906 indicated on FIG. 26 before or after having been detached from the filter.

The slide once folded is placed astride the upper edge of the filter or filter-holder such that, on the one hand, the mark furnished by the lower end 908 of the slide is placed within the filter and directed approximately towards the bottom of it thus indicating the amount of coffee to be measured out and, on the other hand, the part folded along the dotted line 906 is placed outside the filter for the reading off of the offset graduations appearing on that part and corresponding to the amount of coffee indicated by the mark provided by the lower end 908.

FIG. 31 represents a moveable slide 1000 made of the same material as the filter and standing on the bottom of it. The width of the foot of the slide 1002 is less than the width of the bottom of the filter.

The coffee measurement levels 1004 are represented by steps staggered on either edge of the slide (pyramid shape) with a broad space for the graduations across the whole thickness of the slide as detailed on FIG. 43.

This provides good legibility for the graduations. Slide 1000 is taller than the filter 4 by the length of a tab 1008 by which it can be manipulated.

In a variant not represented the slide 1000 is foldable like slide 900.

This type of slide is appropriate for advertising messages on coffees produced by the roasters.

In the type of embodiment just described, the paper or fiber slide can be used in a stable position for measuring out coffee, being either firmly fixed to the filter or moveable with respect to it. In this latter case, the slide may be simply placed at the bottom of the filter leaning against the wall or arranged astride the edge of the filter or filter-holder.

In a third type of embodiment, other types of moveable slides are simply placed at the bottom of the filter or on the filter, the filter-holder or, more generally, the coffee-maker during measuring out while being arranged along the wall of the filter. They may have a fastening system used in the stowage position when not in use.

FIGS. 32 to 35 and 41 illustrate different types of slide placed at the bottom of the filter.

Figure 32:
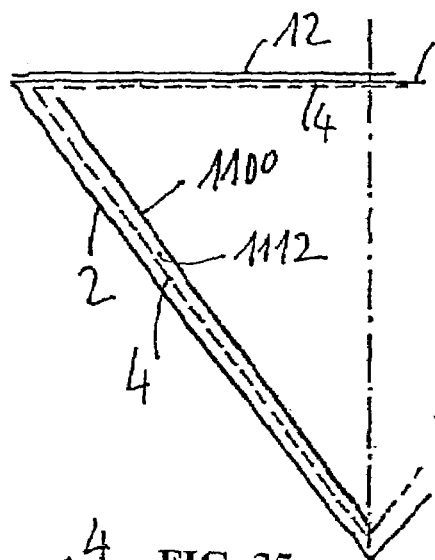
FIGS. 32 to 35 illustrate a type of slide in accordance with the invention which is simply placed at the bottom of the filter.

FIG. 32 represents a slide 1100 placed for measuring out at the bottom of the filter 2 along the filter wall and in contact with it.

Figure 33:
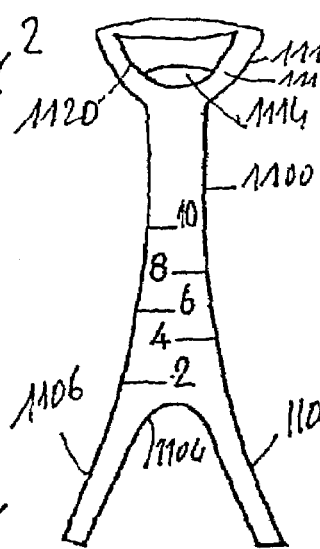
Figure 34:
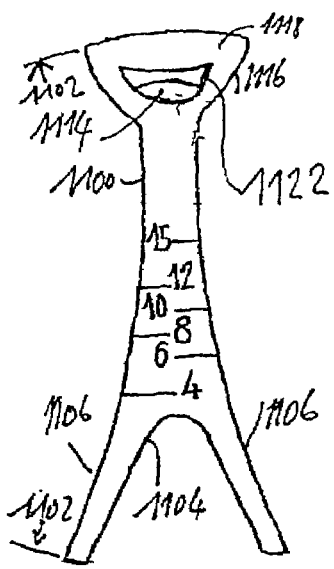

FIGS. 33 and 34 represent respectively the two faces of the slide 1100, one with graduations for six large cups and the other with graduations for fifteen small cups.

In this way two different scales are provided on the same slide.

Figure 35:
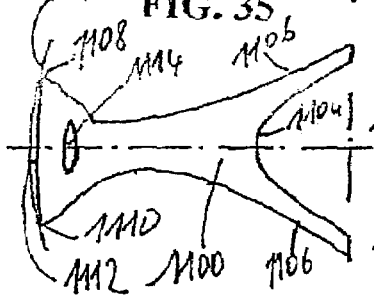

FIG. 35 represents the slide 1100 placed in top view (without its graduations) during measuring out.

With reference to these drawings, the slide 1100 has a height enabling it to fit into the filter-holder volume 2 equipped with its lid 12 or in the closed filter-holder volume when it is of the pivoting type.

The upper and lower contours of the slide 1100 fit into a circle 1102 (partly represented on FIG. 34) with a diameter less than that of the filter opened in the filter-holder. This feature enables the slide to be placed flat within the filter in the volume between the upper level of the coffee when expanded and the lid 12.

In its lower part, the slide widens out with a cut-out 1104 designed to facilitate the flow of the percolation water towards the filter bottom.

On either side of this cut-out, two legs 1106 ensure the stability of the slide.

The overall width of the slide at the base of the two legs corresponds to the length of the bottom fold of the filter minus a few millimeters.

Thus when the slide falls to the bottom of the filter it is immediately centered then tips against the inclined filter wall.

In its upper part, the slide 1100, on account of its width, rests at two distant points 1108 and 1110 of the filter (FIG. 35) thus creating a free space 1112 between the filter 4 and the slide.

The slide 1100 has an aperture to facilitate grasping and manipulating it. This aperture can symbolize a coffee bean and the external profile contour 1116 of the upper part of the slide can represent a bowl.

On FIG. 33, a large cup 1120 is represented schematically while on FIG. 34 the shape 1122 represents a small cup.

Between the upper part and the legs, the graduations appear on the body of the slide which may have a rectangular transversal cross-section or be slightly convex with rounded edges.

The graduations may be shown on one face for the large cups (FIG. 33) and on the other face for the small cups (FIG. 34). Being staggered, the graduations are full height and easily readable.

In the case of the graduations appearing on one face of the slide only, this may be identical in cross-section to the slide in FIG. 12 for articulated slides.

The graduations embodied in the material of the slide may be a combination of raised and depressed surfaces enhancing legibility through shadowing. They may be in accordance with the representation on FIG. 42 embodied in the slide material: in this case they constitute the whole of the slide, the remainder having been removed apart from the outline of the slide. The constituent material of the slide in FIG. 42 is shaped so as to provide a transverse circular or polygonal cross-section for example. They may also be entirely cut out from the thickness of the slide material as indicated in FIG. 43.

Due to contrast, reading off the graduations on FIGS. 42 and 43 is facilitated.

Figure 36:
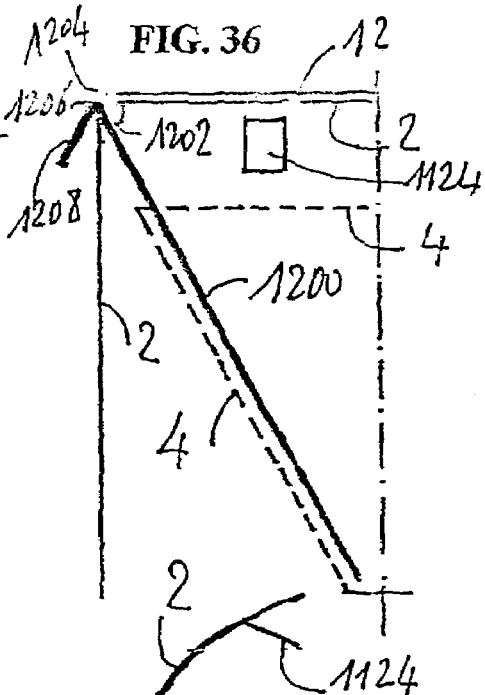
FIG. 36 represents a vertical cross section view of a slide 1200 hooked to the coffee-maker during measurement.
Figure 37:
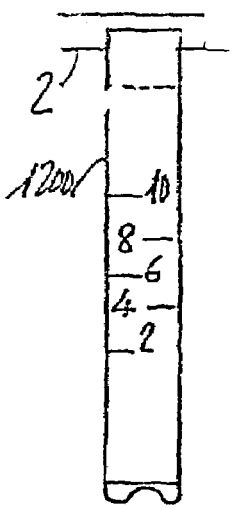
FIG. 37 represents a front view of the slide in FIG. 36 during measurement.
Figure 39:
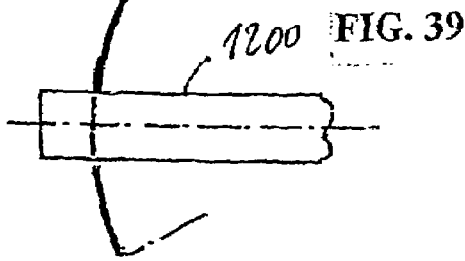
FIG. 39 represents the slide 1200 from above during measurement (without the graduations)

The slide may be stowed flat above the coffee supported on the edge of the filter or filter-holder or else on the support or supports 1124 placed on the filter-holder 2 as in FIGS. 36 and 39.

Through the slot or loophole 176 on the filter-holder as represented on FIG. 22, the slide may be kept on the edge of the filter-holder inside or outside it.

According to variants not represented, the slide can be stowed beneath the lids 12 or 24 using hooks, pins or slots.

The slide can also be accommodated in the volume between the inclined and vertical walls of the filter-holder, in the water tank space, under the lid of the water tank or in the coffee-maker base.

The aperture 1114 in the slide enables the slide to be hung up.

The rounded ends of the two legs fitting into the circle 1102 facilitate the introduction of the slide and its stowage in the packet of coffee.

The moveable slides may also be hooked on to the coffee-maker: by availing themselves of a hooking system used during measuring out and which is also available in the stowage position when not in use.

However, this hooking system is very simple so as not to affect the mobility of the slide.

FIGS. 36, 37, 38 and 39 illustrate types of embodiment of slides hooked to the coffee-maker.

In reference to these figures, slide 1200 is hooked to the filter-holder 2 by a hook 1208.

The filter-holder 2 has an aperture 1202 to take the hook 1208.

The lid 21 may also have an aperture 1204 to take the hook 1208.

The bent shape of the end 1208 (hook) following a fold line 1206 may be established during the manufacture of the slide or later, when the user bends it over.

On account of the folding, the slide 1200 may possess the same features and advantages as the foldable slide 900 described above, as for example offsetting the measuring graduations on to the folded part outside the filter.

Figure 38:
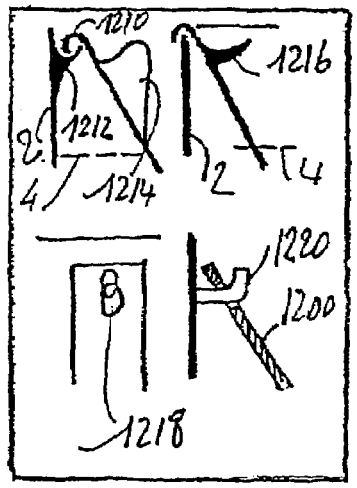
FIG. 38 illustrates several embodiment variants with the hook-on and handling facility.

FIG. 38 represents variants on hooking and manipulation devices (tab) on the slide 1200.

The hook 1210 of the slide 1200 is suspended from the hook 1212 of the filter-holder 2, these two hooks being accommodated entirely within the filter-holder, while the tab 1214 is located in a vertical plane (top left).

The slide 1200 has an aperture 1218 by which it may be suspended from the hook 1220 of the filter-holder 2 (below).

As represented on FIG. 41, a moveable slide 1300 has two cylindrical arms 1302 of variable length enabling the slide to sit above the coffee in the grooves (not shown) on the upper edge of the filter-holder.

The slide 1300 has a coffee measurement feature with two cylinders 1304 which particularly distinguish this measurement level.

A mark 1306 above the marking 1304 indicates a maximum level of coffee to be measured (strong coffee).

Furthermore, a simplified slide may be considered comprising only one or two marks (part 1308 being thus deleted), each corresponding to one graduation, one for the regular serving and the other for a maximum serving.

The slide 1300 may carry a single graduation and there may consequently be several slides available each corresponding to a given level to replace the single slide showing several levels.

The invention claimed is:

1. A device for measuring out coffee in a coffee-maker with a conical filter, comprising at least a slide including at least a mark for measuring out an amount of coffee when said slide is arranged inside a volume defined by a wall of the conical filter, wherein the mark is embodied in the form of a numerical character whose periphery is defined by a cut-out that extends completely through material constituting the slide.

2. The device of claim 1, wherein the mark further includes a reference line associated with the numerical character and whose periphery is defined by a further cut-out that extends completely through the material constituting the slide to reveal the mark in contrast.

3. A device for measuring coffee in a coffee maker with a coffee filter, the device comprising a slide having a mark for measuring an amount of coffee, said slide being arranged inside a volume defined by a wall of the coffee filter and along the wall of the coffee filter when measuring the amount of coffee, and said slide being movable to plural stable positions inside the volume, wherein the slide is secured to the coffeemaker by an articulation which enables the slide to move away from or towards the filter wall.

4. The device according to claim 3, wherein the articulation forms a pivoting linkage.

5. The device according to claim 3, wherein the articulation forms a ball-and-socket linkage.

6. The device according to claim 3, wherein movement of the slide is controlled indirectly by the user.

7. A device for measuring coffee in a coffee filter held in a coffee filter holder of a coffee maker, the device comprising:
   a slide that depends from a top portion of a coffee filter holder of a coffee maker, the slide being along an interior wall of a coffee filter held in the coffee filter holder and within a volume defined by the coffee filter; and
   a mark on said slide for measuring an amount of coffee in the coffee filter.

8. A device for measuring coffee in a coffee maker with a coffee filter, the device comprising a slide having a mark for measuring an amount of coffee, said slide being arranged inside a volume defined by a wall of the coffee filter and along the wall of the coffee filter when measuring the amount of coffee, and said slide having a distal end within the volume that has two legs forming a cut-out between them to facilitate percolation of coffee.

9. The device of claim 8, further comprising two of the mark that are arranged on two opposite faces of the slide.

10. The device according to claim 8, wherein the slide comprises at its opposite end an aperture for grasping.

11. A device for measuring coffee in a coffee maker with a coffee filter, the device comprising a slide having a mark for measuring an amount of coffee, said slide being arranged inside a volume defined by a wall of the coffee filter and along the wall of the coffee filter when measuring the amount of coffee, and said slide being at least partially optically transparent.

* * * * *